3,314,955
PROCESS FOR PROVIDING 2,4,6-
TRIFLUOROPYRIMIDINE
Max M. Boudakian and Charles W. Kaufman, Hamden, Conn., assignors to Olin Mathieson Chemical Corporation, New Haven, Conn., a corporation of Virginia
No Drawing. Filed Feb. 11, 1964, Ser. No. 343,966
3 Claims. (Cl. 260—251)

This application relates to a process for the preparation of 2,4,6-trifluoropyrimidine.

The preparation of fluorinated pyrimidines from the corresponding chlorinated pyrimidines has been heretofore only accomplished with difficulty. For example, E. Kober et al. in J. Am. Chem. Soc. 81, 3769 (1959) have reported that antimony tri- or pentafluoride (Swarts reagent) is not effective in replacing a chlorine atom attached directly to a pyrimidine ring with a fluorine atom.

It has been found that the preparation of 2,4,6-trifluoropyrimidine is a particularly difficult procedure. For example, C. W. Tullock et al. in J. Am. Chem. Soc. 82, 5107 (1960) reported that when an attempt was made to fluorinate 2,4,6-trichloropyrimidine by means of sulfur tetrafluoride at 225° C., only mixtures of partly fluorinated pyrimidines were obtained. H. Schroeder et al. in J. Org. Chem. 27, 2580 (1962) have disclosed the preparation of this derivative wherein 2,4,6-trichloropyrimidine was subjected to three successive fluorination-distillation operations with fresh silver fluoride (AgF). However, there are serious disadvantages associated with this process. A large molar excess of silver fluoride is required in the process (11 moles of AgF to 1.0 mole of 2,4,6-trichloropyrimidine), and in view of the cost of the silver salt the use of this excess is prohibitively expensive. Furthermore, the requirement for a multi-step reflux and distillation operation is tedious and expensive.

2,4,6-trifluoropyrimidine is a useful intermediate in the preparation of other chemical derivatives. For example, I. Wempen et al. in J. Med. Chem. 6, 688 (1963) has prepared 6-fluorocytosine from the fluorinated pyrimidine. This substituted cytosine has been found to exert growth inhibitory activity against the fungi *Candida albicans* and *Saccharomyces carlbergensis*.

Therefore, the principal object of this invention is to provide a direct, efficient and economically attractive process for the preparation of 2,4,6-trifluoropyrimidine.

This object has been accomplished in accordance with this invention. It has been found that 2,4,6-trifluoropyrimidine can be efficiently prepared in high yield and excellent purity by the reaction of 2,4,6-trichloropyrimidine with an alkali metal fluoride in a tetramethylene sulfone solvent. The reaction proceeds at atmospheric pressure, and the fluorinated derivative can be readily isolated upon completion of the reaction by conventional procedures, i.e., fractional distillation. The process is economically attractive since the use of an expensive fluorinating agent is obviated, and only one distillation is required.

Although the alkali metal fluorides may be generally utilized in the process of this invention, the use of potassium fluoride is particularly preferred since it exhibits favorable solubility characteristics in tetramethylene sulfone and is also available at a reasonable cost. Smaller yields of 2,4,6-trifluoropyrimidine have been obtained when less than an equivalent amount of alkali metal fluoride is used in the process, but naturally best yields are provided when at least an equivalent amount of alkali metal fluoride is employed. Excellent yields of product can be obtained in the absence of a large excess of fluoride salt, a feature of this invention which is in sharp contrast to the large excess of costly AgF required in a similar fluorination.

The process disclosed herein can be carried out at reaction temperatures up to the reflux temperature of tetramethylene sulfone (about 270° C.). However, the solvent does tend to degrade somewhat at higher temperatures, and preferably a temperature range of from about 75° C. to about 220° C. should be utilized in the practice of this invention. Even more preferably, a temperature range of about 115°–160° C. should be employed in the procedure.

Generally speaking, it is convenient to remove inorganic salts from the reaction mixture upon completion of the fluorination prior to isolating the 2,4,6-trifluoropyrimidine. Filtration procedures are satisfactory for this purpose. However, this step is not a necessity since, if desired, a distillation procedure could be immediately begun upon completion of the fluorination.

The following example will serve to illustrate the improved fluorination procedure of this invention.

*Example*

A mixture of 55.2 g. (0.295 mole) of 2,4,6-trichloropyrimidine, 70.5 g. (1.21 moles) of anhydrous potassium fluoride and 175 mls. of freshly distilled tetramethylene sulfone was placed in a 3-necked reaction flask equipped with stirrer. The mixture was heated with vigorous stirring for seven hours at 125°–127° C. The reaction mixture was cooled to 40° C. and filtered through a sintered glass funnel. The separated inorganic salts were then dried at 100° C./1–2 mm. for four hours. A total of 20.9 g. of organic product was collected in the Dry Ice trap from the salt cake drying operation and was combined with the filtrate.

The dried salts weighed 104.7 g. and halogen analysis of this salt material revealed that a 98.3% conversion of 2,4,6-trichloropyrimidine had been obtained based on chlorine cleavage.

The combined organic layer (236 g.) was distilled through a Vigreaux column and 33.5 g. of a clear colorless liquid, B.P. 59°–60° C./183 mm., $n_D^{29}$ 1.4010, was isolated.

Vapor phase-chromatography analysis revealed that the colorless liquid was 2,4,6-trifluoropyrimidine in over 99% purity. Yield: 85%.

Nuclear magnetic resonance and mass spectroscopy analysis further confirmed the product as pure 2,4,6-trifluoropyrimidine. Mass spectroscopy analysis also revealed that the product had a molecular weight of 135 (theoretical is 134).

What is claimed is:

1. A process for the preparation of 2,4,6-trifluoropyrimidine which comprises reacting 2,4,6-trichloropyrimidine with potassium fluoride in tetramethylene sulfone solvent at a reaction temperature range of from about 75° C. to about 220° C., and isolating said fluorinated derivative from the reaction mixture.

2. A process for the preparation of 2,4,6-trifluoropyrimidine which comprises reacting 2,4,6-trichloropyrimidine with at least an equivalent amount of potassium fluoride in tetramethylene sulfone solvent at a temperature range of about 115°–160° C., and isolating said fluorinated derivative from the reaction mixture.

3. A process for the preparation of 2,4,6-trifluoropyrimidine which comprises reacting 2,4,6-trichloropyrimidine with at least an equivalent amount of potassium fluoride in tetramethylene sulfone solvent at a temperature range of about 115°–160° C., removing inorganic salts from the reaction mixture, and distilling said fluorinated derivative from the reaction mixture.

No references cited.

NICHOLAS S. RIZZO, *Primary Examiner.*